(12) United States Patent
Breedy

(10) Patent No.: US 11,477,283 B2
(45) Date of Patent: Oct. 18, 2022

(54) REMOTE SERVER MANAGEMENT USING A POWER LINE NETWORK

(71) Applicant: DELL PRODUCTS L.P., Round Rock, TX (US)

(72) Inventor: Andrew Breedy, Cork (IE)

(73) Assignee: DELL PRODUCTS L.P., Round Rock, TX (US)

(*) Notice: Subject to any disclaimer, the term of this patent is extended or adjusted under 35 U.S.C. 154(b) by 48 days.

(21) Appl. No.: 16/867,550

(22) Filed: May 5, 2020

(65) Prior Publication Data
US 2021/0352145 A1 Nov. 11, 2021

(51) Int. Cl.
*H04L 67/12* (2022.01)
*H04L 41/0246* (2022.01)
*H04B 3/54* (2006.01)

(52) U.S. Cl.
CPC ............ *H04L 67/12* (2013.01); *H04B 3/544* (2013.01); *H04L 41/0246* (2013.01)

(58) Field of Classification Search
CPC ..... H04L 67/12; H04L 41/0246; H04L 41/04; H04L 41/34; H04L 43/0811; H04B 3/544
See application file for complete search history.

(56) References Cited

U.S. PATENT DOCUMENTS

| | | | | |
|---|---|---|---|---|
| 7,531,922 B1* | 5/2009 | Olson | ............ | H05B 47/185 307/157 |
| 10,886,971 B1* | 1/2021 | Pleiter | ............ | H04B 3/542 |
| 2003/0224784 A1* | 12/2003 | Hunt | ............ | H04B 3/54 455/426.2 |
| 2005/0001694 A1* | 1/2005 | Berkman | ............ | H04B 3/56 370/464 |
| 2005/0047379 A1* | 3/2005 | Boyden | ............ | H04B 1/7163 370/338 |
| 2006/0087872 A1* | 4/2006 | Barsun | ............ | G06F 1/26 363/146 |
| 2006/0253697 A1* | 11/2006 | Schulz | ............ | H04L 63/062 713/150 |
| 2007/0189182 A1* | 8/2007 | Berkman | ............ | H04B 3/58 370/252 |
| 2012/0128081 A1* | 5/2012 | Hikihara | ............ | H04B 3/54 375/257 |

(Continued)

OTHER PUBLICATIONS

Wikipedia,"Power-line communication," [online], [Retrieved May 18, 2020]. Retrieved from Internet <URL:https://en.wikipedia.org/wiki/Power-line_communication> (10 pgs).

(Continued)

*Primary Examiner* — Brenda H Pham
(74) *Attorney, Agent, or Firm* — North Weber & Baugh LLP

(57) ABSTRACT

Systems and method of remote server management replace the traditional server network port associated network cabling with power line networking by using a server's power cables are used to carry both power and Ethernet traffic between the remote server and a network management switch. In this manner, the amount of network cabling in a server rack is reduced, and the need for a management port on a server is eliminated, freeing up ports on a top of rack switch that, otherwise, would have been used for management purposes only.

20 Claims, 5 Drawing Sheets

(56) References Cited

U.S. PATENT DOCUMENTS

2017/0099518 A1* 4/2017 Hsueh .................... H02J 13/00

OTHER PUBLICATIONS

Wikipedia, "Home networking (LAN)," [online], [Retrieved May 18, 2020]. Retrieved from Internet <URL: https://en.wikipedia.org/wiki/Power-line_communication#Home_networking_(LAN)> (10 pgs).

Wikipedia, "IEEE 1901," [online], [Retrieved May 18, 2020]. Retrieved from Internet <URL:https://en.wikipedia.org/wiki/IEEE_1901> (6 pgs).

IEEE SA, "1901-2010—IEEE Standard for Broadband over Power Line Networks: Medium Access Control and Physical Layer Specifications," [online], [Retrieved May 18, 2020]. Retrieved from Internet <URL: https://standards.IEEE.org/standard/1901-2010.html> (3 pgs).

Wikipedia, "HomePlug," [online], [Retrieved May 18, 2020]. Retrieved from Internet <URL:https://en.wikipedia.org/wiki/HomePlug> (8 pgs).

* cited by examiner

400

REMOTE SERVER MANAGEMENT USING A POWER LINE NETWORK

BACKGROUND

The present disclosure relates generally to information handling systems and methods. More particularly, the present disclosure relates to remote server management systems and methods using a power line network.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server management methods use a network cable—typically an Ethernet cable—to connect a switch port on a top of rack management switch to a dedicated network management port on a remote server. Such methods take up ports on top of rack switches, create cable clutter, and increase the likelihood of configuration errors in cabling.

Accordingly, it is highly desirable to reduce or eliminate the shortcomings of existing designs.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

Figure 1:
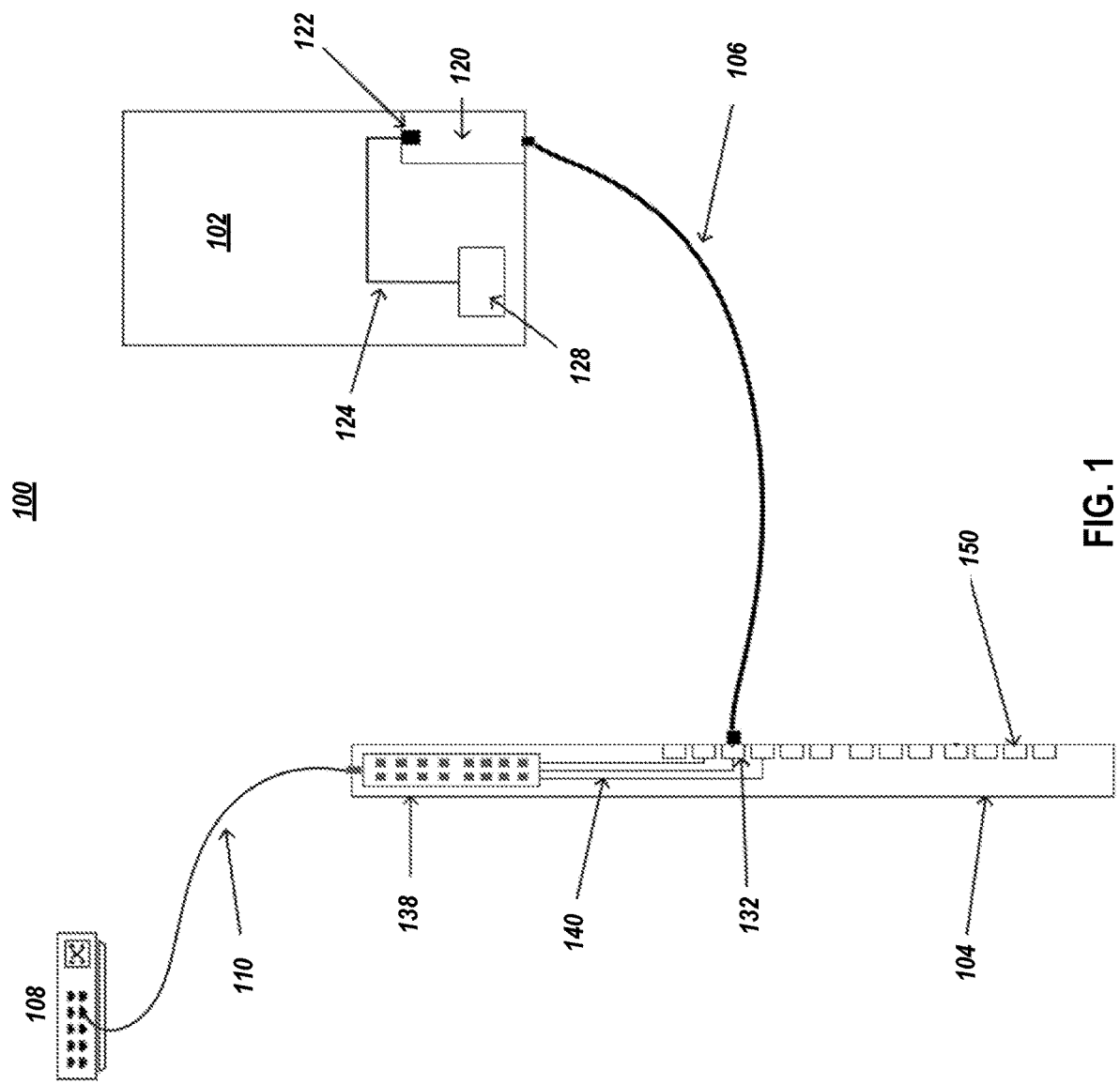
FIG. 1 depicts an exemplary system for remote server management through a power line network according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It is noted that although embodiments described herein may be within the context of certain protocols, aspects of the present disclosure are not so limited. While the disclosure mainly discusses Ethernet and power line protocols, it is understood that any type of protocol may be used to benefit from the teachings of the present disclosure. Accordingly, the aspects of the present disclosure may be applied or adapted for use in other contexts. In this document, the terms "electronics" and "circuit" are used interchangeably. Similarly, "the terms "power electronics," "power line electronics," and "power network electronics" are used interchangeably. "Power line" refers to a communication link that may carry electric power and communicate data at the same time.

FIG. 1 Illustrates an exemplary system for remote server management through a power line network according to embodiments of the present disclosure. As depicted, system 100 in FIG. 1 comprises server 102, power distribution unit 104, and power line 106. Server 102 may comprise power line electronics 122, server power supply unit 120, and server remote management controller 128.

In embodiments, remote server management controller 128 may comprise circuitry that is coupled to server 102, e.g., circuitry that is integrated with the server's 102 motherboard. In embodiments, controller 128 may perform functions to remotely manage server 102. Exemplary functions comprise monitoring various components in server 102, such as the central processing units (CPUs), fans, and memory. Other functions may comprise upgrading the firmware and/or the BIOS (not shown) of server 102.

In embodiments, power line electronics 122 may be implemented as part of a plug-in power supply, e.g., server power supply unit 120, within server 102. In embodiments, power line electronics 122 may be implemented directly onto a board within server 102. In embodiments, link 124 between power electronics 122 and server remote management module 128 may be implemented by using an electronic data path that may be an integrated circuit, such as a data bus. In operation, link 124 may transmit management Ethernet data to and from server remote management controller 128.

Power distribution unit 104, which may be implemented in a server rack power distribution unit, comprises management switch 138, power line electronics 132, sockets (e.g., 150), and Ethernet data paths 140. As depicted in FIG. 1, management switch 138 may be integrated into power distribution unit 104 and comprise any number of management ports (e.g., 138) that in example in FIG. 1 are located in the front-end of power distribution unit 104. It is understood that, in embodiments, management switch may be implemented as an integrated circuit, e.g., a management network switch that is connected to an application specific integrated circuit (ASIC) (not shown), rather than a stand-alone physical management switching module. In operation, management switch 138 may establish a network uplink connection, e.g., via core network switch 108, to an external network, e.g., a core or management network.

In embodiments, power line network electronics 132 may be integrated into power distribution unit 104 and operates similar to power line network electronics 122. In embodiments, each of a number of sockets 150 that are connected to power line network circuit 132 may have a footprint of, e.g., 2-3 cm$^2$. In embodiments, each power line network circuit 132 may communicate with integrated management switch 138 via Ethernet data paths 140 that, in embodiments, may be implemented using data busses and similar devices, e.g., internal connections that provide a data path between each power socket 150 and management switch 138.

In embodiments, socket 150 is designed to mate to power line 106, and each power socket (e.g., 150) may have a 1:1 connection to each power line network circuit (e.g., 122). However, this is not intended as a limitation on the scope of the present disclosure since, in embodiments, two or more sockets may be treated as a single communication port, e.g., through the use of an adapter configured to receive and transmit data and power from two or more sockets.

It is noted that, in embodiments, the arrangement and dimensions of sockets 150 may be customized according to vendor specifications, e.g., to reduce the obstruction of air flow. It is further noted that the present disclosure is not limited to any type of connector, port, or socket as other many designs may be used to accomplish the teachings of the present disclosure.

In embodiments, power line 106 may be implemented as a power cable, e.g., an alternating current (AC) power cable, that has two ends 126, 217 and is designed to provide both electrical power and data connectivity between server 102 and power distribution unit 104. It is understood that power line 106 may comprise any type and number of wires, may not support a ground connection, and may support any type of signals known in the art. It is further understood that power line 106 may carry any type of power line signals in its wiring, including inside and at the surface of a ground wire, e.g., depending on frequency, propagation mode, and other signal characteristics.

In operation, once power line 106 connects power supply unit 120 with power distribution unit 104 in system 100, power line network circuits 122, 132 may communicate signals, such as server management commands, with each other. In embodiments, power line electronics 122 may perform remote server management functions, such as sending Ethernet signals, which, in existing systems, would be performed by a separate network port. In embodiments, power line electronics 122 may modulate and/or demodulate signals and convert power line data to Ethernet data, e.g., by converting signals incoming on power line 106 from power line protocol to Ethernet protocol. The signals that are converted to Ethernet data may then be further processed, e.g., by remote server management controller 128 located within server 102.

Conversely, outgoing management traffic, e.g., Ethernet traffic, that may originate at server remote management controller 128 ingresses on power line electronics 122 where the Ethernet traffic will undergo a conversion from Ethernet protocol to power line protocol, e.g., from Ethernet signals to power line signals, prior to being transmitted by power line 106 to power distribution unit 104. In embodiments, server management controller 128 may gather data about server 102 in response to a request by a system administrator.

Power distribution unit 104, which may be implemented in a server rack power distribution unit, comprises In embodiments, counterpart power line network circuit 132 at power distribution unit 104 may convert incoming signals, e.g., management traffic received from power line protocol, into Ethernet protocol to obtain Ethernet data. Similarly, power line network circuit 132 may convert outgoing data signals, e.g., Ethernet traffic that power distribution unit 104 receives, via management switch 138 and uplink 110, which may have originated at core network switch 108, from Ethernet protocol to power line protocol, prior to switching the traffic to socket 150 for transmission to server 102.

In embodiments, one or more components coupled to power line 106 may comprise a logic circuit that monitors power line 106, e.g., in periodic or random intervals, for the presence of a power line signal or a component thereof. In embodiments, the power line signal itself may comprise a wake-up signal.

It is understood that certain implementations may utilize supporting structures, adapters, and other auxiliary items or devices (not shown), for example, to simplify installation, configuration, and maintenance. For example, to reduce the stress on socket 150 that may be caused by power line 106, in embodiments, certain supporting structures may be used to provide mechanical support.

Figure 2:
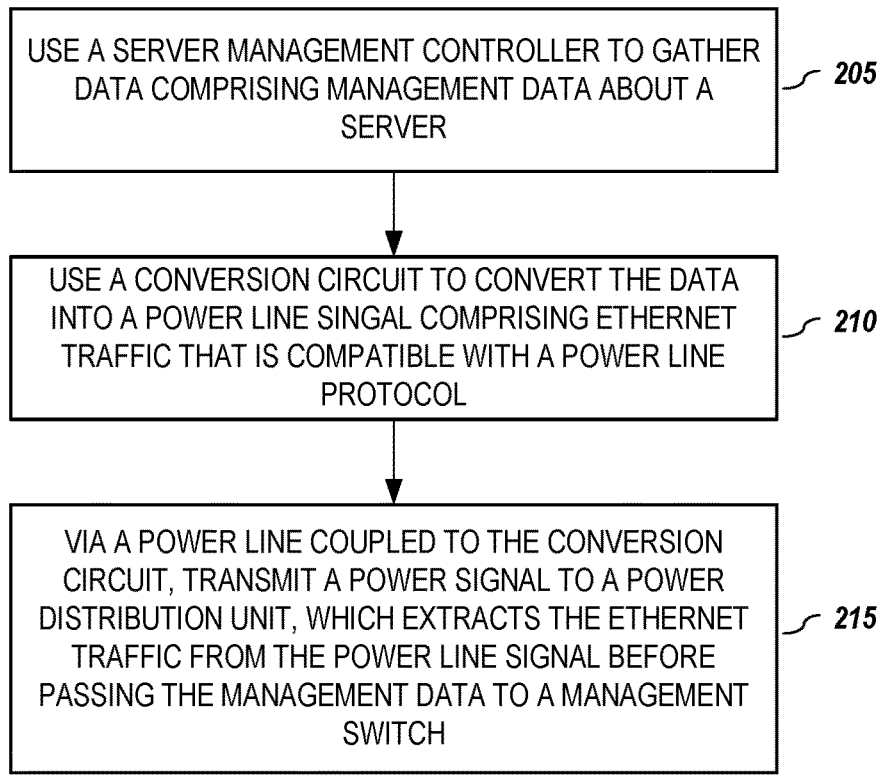
FIG. 2 depicts an exemplary method for remote server management through a power line network according to embodiments of the present disclosure.

FIG. 2 depicts an exemplary method for remote server management through a power line network according to embodiments of the present disclosure. Process 200 may begin when a remote server management controller is used to gather (205) data comprising management data associated with a server. In embodiments, a conversion circuit at a server may be used (210) to convert at least some of the data into Ethernet traffic compatible with a power line protocol, e.g., in response to logic circuit in the server monitoring and detecting a power line (e.g., an AC cable), a power line signal, or a component of a power line signal.

The server may then transmit (215), for example via a power line that is coupled to the conversion circuit, the Ethernet traffic along with a power signal to a power distribution unit that may comprise a management switch, whose management command may have triggered the monitoring or detection.

In embodiments, the power distribution unit may be configured to separate or extract the Ethernet traffic form the power signal and transmit the Ethernet traffic, e.g., via an Ethernet network, to the management switch, which may be accessed, e.g., by a system administrator for sending and receiving remote management commands.

It shall be noted that: (1) certain steps herein may optionally be performed; (2) steps may not be limited to the specific order set forth herein; (3) certain steps may be performed in different orders; and (4) certain steps may be done concurrently.

Figure 3:
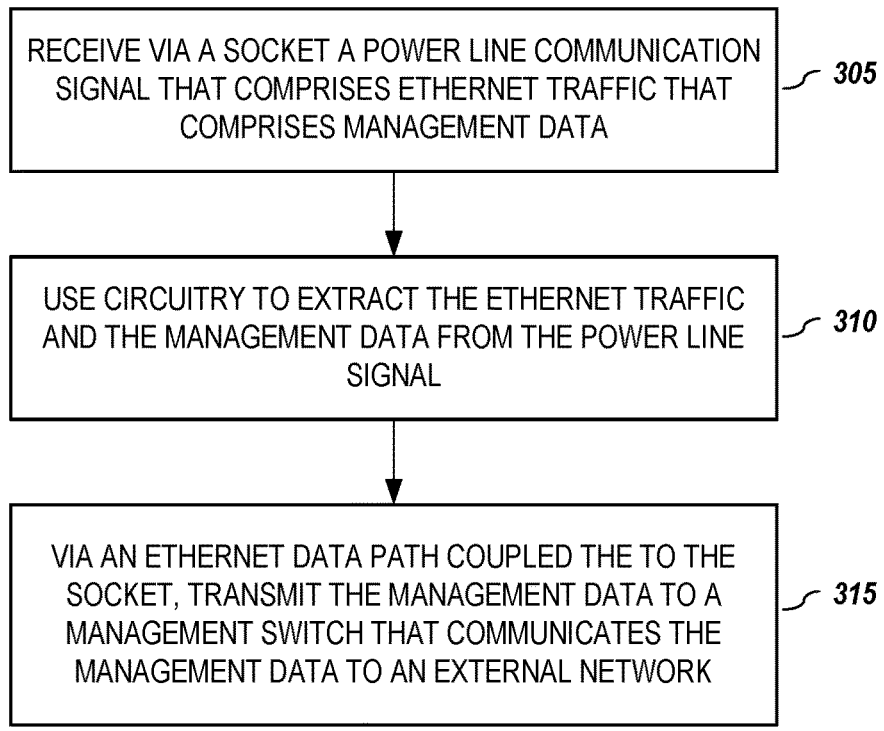
FIG. 3 depicts another exemplary method for remote server management through a power line network according to embodiments of the present disclosure.

FIG. 3 depicts another exemplary method for remote server management through a power line network according to embodiments of the present disclosure. In embodiments, process 300 may begin when a power line signal is received (305) via a socket that may be coupled to a power line. The power line signal may comprise Ethernet traffic that comprises management traffic.

In embodiments, a circuit may be used (310) to extract the Ethernet traffic from the power line signal according to various embodiments of the present disclosure.

The Ethernet traffic may then be transmitted (315), for example via an Ethernet data path that is coupled to the conversion circuit, to a management switch that may communicate some or all of the management data to an external network.

As will be apparent to a person of skill in the art, unlike existing server management methods that take up ports on top of rack switches, a separate management port on the server and circuitry to connect such management ports to the management controller, create cable clutter (e.g., hundreds of feet of cable per rack), and may lead to configuration errors, the systems and methods described herein, reduce or eliminate network cables between management switch port and server management ports on remote servers and associated electronics. Advantageously, this significantly improves air flow and cooling, thereby, reducing power consumption, increases rack space and thus computing space, reduces complexity, reduces component count and cost, and reduces installation and operating cost in datacenters, server farms, and similar environments.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.), smart watch, server (e.g., blade server or rack server), a network storage device, camera, or any other suitable device and may vary in size, shape, performance, functionality, and price. The computing system may include random access memory (RAM), one or more processing resources such as a CPU or hardware or software control logic, read-only memory (ROM), and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 4:
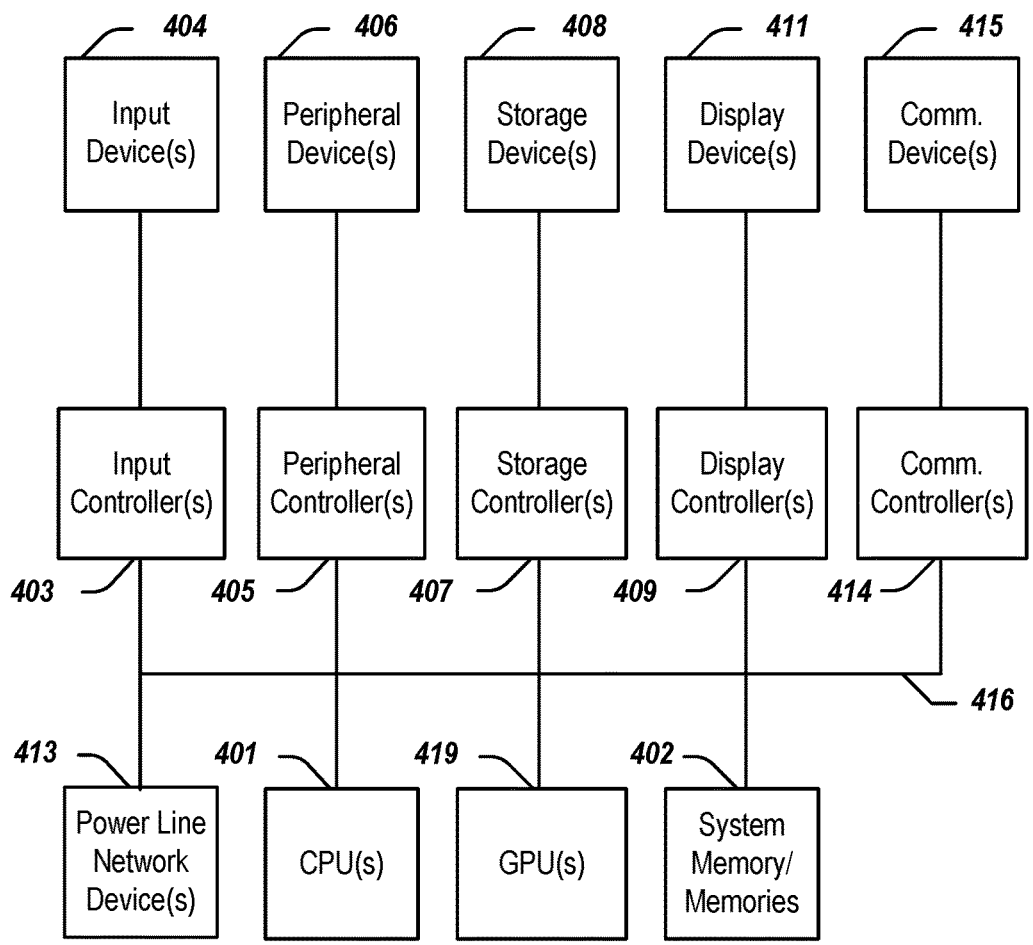
FIG. 4 depicts a simplified block diagram of an information handling system according to embodiments of the present invention.

FIG. 4 depicts a simplified block diagram of an information handling system (or computing system) according to embodiments of the present disclosure. It will be understood that the functionalities shown for system 400 may operate to support various embodiments of a computing system—although it shall be understood that a computing system may be differently configured and include different components, including having fewer or more components as depicted in FIG. 4.

As illustrated in FIG. 4, the computing system 400 includes one or more central processing units (CPU) 401 that provides computing resources and controls the computer. CPU 401 may be implemented with a microprocessor or the like, and may also include one or more graphics processing units (GPU) 419 and/or a floating-point coprocessor for mathematical computations. System 400 may also include a system memory 402, which may be in the form of RAM, ROM, or both.

A number of controllers and peripheral devices may also be provided, as shown in FIG. 4. An input controller 403 represents an interface to various input device(s) 404, such as a keyboard, mouse, touchscreen, and/or stylus. The computing system 400 may also include a storage controller 407 for interfacing with one or more storage devices 408 each of which includes a storage medium such as magnetic tape or disk, or an optical medium that might be used to record programs of instructions for operating systems, utilities, and applications, which may include embodiments of programs that implement various aspects of the present disclosure. Storage device(s) 408 may also be used to store processed data or data to be processed in accordance with the disclosure. The system 400 may also include a display controller 409 for providing an interface to a display device 411, which may be a cathode ray tube (CRT), a thin film transistor (TFT) display, organic light-emitting diode, electroluminescent panel, plasma panel, or other type of display. The computing system 400 may also include one or more peripheral controllers or interfaces 405 for one or more peripherals 406. Examples of peripherals may include one or more printers, scanners, input devices, output devices, sensors, and the like. A communications device 414 may interface with one or more communication devices 415, which enable the system 400 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

The computing system 400 may further comprise one or more power line network devices 413 that may communicate management and other data within computing system 400 and/or between computing system 400 and other devices, e.g., using a power line network and/or any of the above-mentioned variety of networks.

In the illustrated system, all major system components may connect to a bus 416, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network that may comprise a power line network. Such data and/or programs may be conveyed through any of a variety of machine-readable medium including, but are not limited to: magnetic media such as hard disks, floppy disks, and magnetic tape; optical media such as compact disk (CD)-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 5:
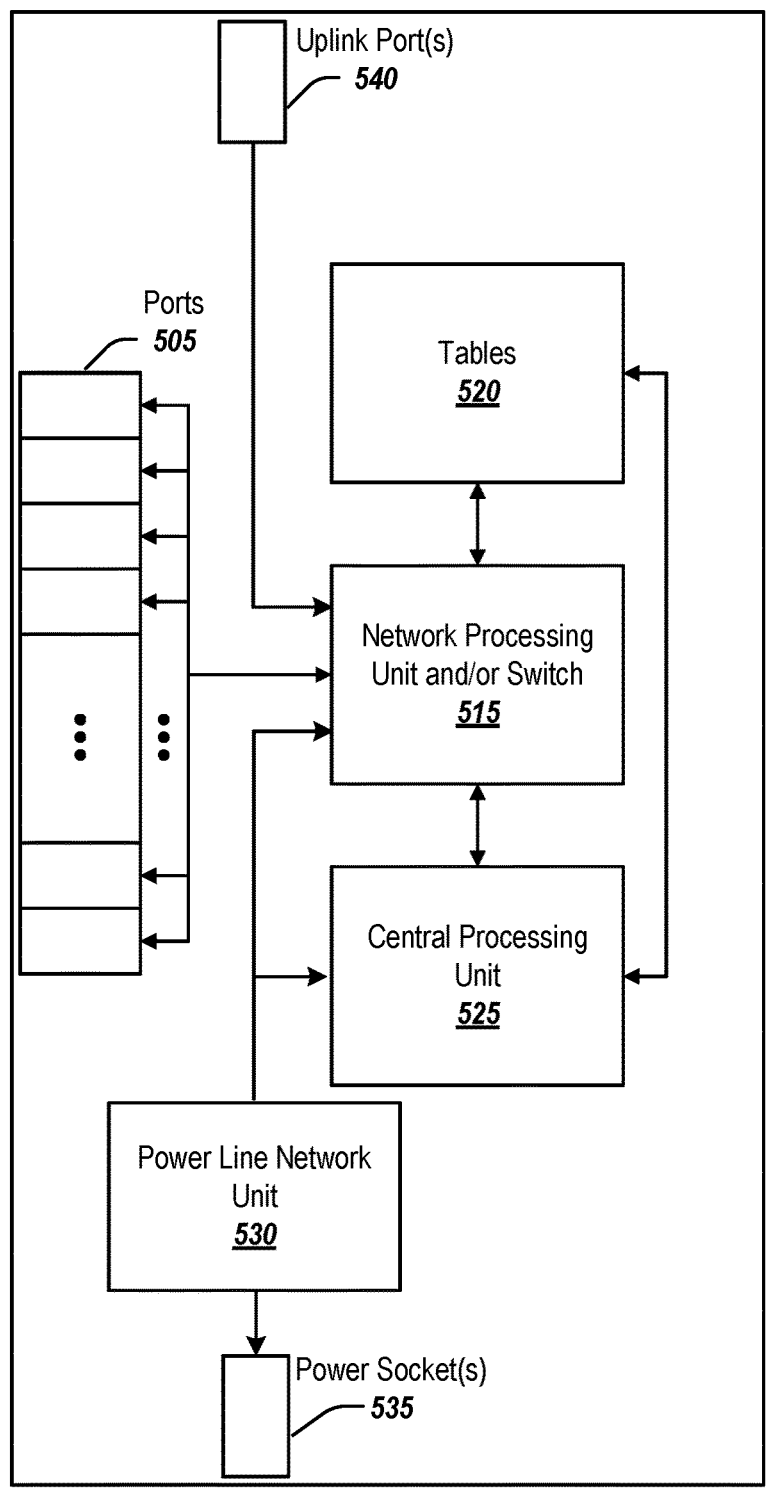
FIG. 5 depicts an alternative block diagram of an information handling system according to embodiments of the present disclosure.

FIG. 5 depicts an alternative block diagram of an information handling system according to embodiments of the present disclosure. It will be understood that the functionalities shown for system 500 may operate to support various embodiments of the present disclosure—although it shall be understood that such system may be differently configured and include different components (including fewer or more components). In embodiments, system 500 may be a power distribution unit, such as power distribution unit 140.

The information handling system 500 may include a plurality of I/O ports 505, one or more network processing unit (NPUs) and/or switches 515, one or more tables 520, a CPU 525, power line network unit 530, power socket(s) 535, and uplink port(s) 540. The system includes a power supply (not shown) and may also include other components, which are not shown for sake of simplicity.

In one or more embodiments, the I/O ports 505 may be connected via one or more cables. NPU/switch 515 may use information included in the network data received at the node 500, as well as information stored in the tables 520, to identify a next device for the network data, among other possible activities. In one or more embodiments, a switching fabric may then schedule the network data for propagation through the node to an egress port for transmission to the next destination.

In one or more embodiments, power line network unit 530 may receive at power socket(s) 535 management and other data and communicate that data directly or indirectly, e.g., via network processing unit (NPU)/switch 515 to uplink port(s) 540 that establish a network uplink connection. Power socket(s) 535 may be designed to mate to a cable, such as an AC power cable described with reference to FIG. 1, to communicate with one or more other network devices compatible with a power line network.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as ASICs, PLDs, flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A remote server management method comprising:
using a remote server management controller to gather data comprising management data associated with a server;
using a conversion circuit to convert at least some of the data into a power line signal, the power line signal being compatible with a power line protocol; and
via a power line that is communicatively coupled to the conversion circuit, transmitting the power line signal to a power distribution unit that comprises a management switch, the power distribution unit configured to:
provide power to the server via the power line;
detect the power line signal in response to receiving a wake-up signal;
extract the management data from the power line signal; and
transmit the management data, over a network, to the management switch that is accessible by a system administrator.

2. The method of claim 1, further comprising, monitoring, in periodic or random intervals, the presence of at least one of the power line or a signal associated with the power line.

3. The method of claim 2, further comprising, responsive to detecting at least one of the power line or the signal associated with the power line, using the conversion circuit to extract the management data from the power line signal.

4. The method of claim 1, further comprising, sending the management data to an external network.

5. The method of claim 1, further comprising, receiving the data about the server in response to a request by the system administrator.

6. The method of claim 1, wherein the power line comprises an alternating current (AC) power cable.

7. The method of claim 1, further comprising:
receiving an incoming power line signal via the power line;
extracting data from the incoming power line signal; and
using the data to affect management of the server.

8. A server management system comprising:
a server comprising a power supply unit;
a server management controller communicatively coupled to the server to gather data comprising management data associated with the server;
a first circuit that converts the data into a power line signal;
a power distribution unit comprising a socket to receive the power line signal from a power line and to supply power to the server via the power line;
a second circuit coupled to the socket to extract the data from the power line signal, wherein the power line signal is detected in response to receiving a wake-up signal;
a data path communicatively coupled to the socket to carry network traffic that comprises at least the data; and
a management switch communicatively coupled to the data path to communicate at least some of the network traffic that comprises management data to an external network.

9. The server management system of claim 8, wherein at least one of the first circuit and the second circuit is integrated within the power supply unit.

10. The server management system of claim 8, wherein the second circuit detects the power line signal in response to a request that has been received via the management switch.

11. The server management system of claim 8, wherein the data is Ethernet data.

12. The server management system of claim 8, wherein the power supply unit is integrated within at least one of the server and the power distribution unit.

13. The server management system of claim 8, wherein the management switch is integrated within the power distribution unit.

14. The server management system of claim 8, wherein at least one of the server or the power distribution unit comprises a logic circuit to monitor the power line for at least a component of power line signal.

15. A power distribution unit comprising:
a socket to couple to a power line to receive a power line signal that comprises management data about a server and to provide power to the server via the power line;
circuitry coupled to the socket to extract the management data from the power line signal, in which the power line signal is detected in response to receiving a wake-up signal;
a data path communicatively coupled to the socket, the data path designed to carry network traffic comprising at least the management data; and
a management switch communicatively coupled to the data path, the management switch configured to communicate at least some of the management data in the network traffic to an external network.

16. The power distribution unit of claim 15, wherein the external network comprises a core network switch designed to communicate server management commands with the management switch.

17. The power distribution unit of claim 15, wherein the power distribution unit comprises a plurality of sockets, in which each socket is capable of transmitting a power line signal and is capable of supplying power to a connected device.

18. The power distribution unit of claim 15, wherein the power distribution unit monitors, in periodic or random intervals, the presence of a signal on the power line.

19. The power distribution unit of claim 18, wherein, responsive to detecting the signal, the power distribution unit uses the circuitry to extract the management data from the power signal.

20. The power distribution unit of claim 15, wherein the power line comprises an alternating current (AC) power cable.

* * * * *